United States Patent
Laming et al.

(10) Patent No.: US 6,741,769 B2
(45) Date of Patent: May 25, 2004

(54) OPTICAL DEVICE

(76) Inventors: Richard Ian Laming, 6 Braid Mount, Edinburgh EH10 6JL (GB); Tsjerk Hans Hoekstra, 7 Turner Avenue, Balerno-Edinburgh EH14 7BS (GB)

(*) Notice: Subject to any disclaimer, the term of this patent is extended or adjusted under 35 U.S.C. 154(b) by 49 days.

(21) Appl. No.: 10/182,200
(22) PCT Filed: Jan. 29, 2001
(86) PCT No.: PCT/GB01/00353
§ 371 (c)(1), (2), (4) Date: Sep. 18, 2002
(87) PCT Pub. No.: WO01/55781
PCT Pub. Date: Aug. 2, 2001

(65) Prior Publication Data
US 2003/0048496 A1 Mar. 13, 2003

(30) Foreign Application Priority Data
Jan. 28, 2000 (GB) .............................................. 0002116

(51) Int. Cl.$^7$ .................................................. G02B 6/00
(52) U.S. Cl. .............................. 385/16; 385/2; 385/130; 385/131; 385/140; 385/30; 385/40; 385/43
(58) Field of Search ............................. 385/1, 2, 8, 16, 385/27, 30, 40, 43, 129, 130, 131, 140

(56) References Cited

U.S. PATENT DOCUMENTS

| | | | |
|---|---|---|---|
| 5,009,483 A | 4/1991 | Rockwell, III | |
| 5,857,039 A | 1/1999 | Bosc et al. | |
| 6,385,383 B1 * | 5/2002 | Marcuse et al. | 385/140 |
| 6,434,318 B1 * | 8/2002 | Bischel et al. | 385/140 |
| 2002/0037129 A1 * | 3/2002 | Brinkman et al. | 385/16 |

FOREIGN PATENT DOCUMENTS

| | | |
|---|---|---|
| EP | 0306956 A2 | 3/1989 |
| EP | 0980018 A2 | 2/2000 |
| GB | 2329721 A | 3/1999 |
| WO | WO 9701782 | 1/1997 |

* cited by examiner

Primary Examiner—Hemang Sanghavi

(57) ABSTRACT

An optical device comprises a substrate having at least one light-guiding core and cladding material surrounding the core; a cladding-modifying element disposed alongside, at least in part, a portion of the light-guiding core, the cladding-modifying element being formed of a material different to the cladding material so that the refractive index difference between the material of the cladding-modifying element and the cladding material is dependent upon the temperature of the cladding-modifying element; and a heating and/or cooling arrangement for altering the temperature of the cladding-modifying element.

12 Claims, 3 Drawing Sheets

OPTICAL DEVICE

This invention relates to optical devices.

In the development of optical networks, a technology known as dense wavelength division multiplexing (DWDM) is being extensively investigated.

DWDM employs many closely spaced optical carrier wavelengths, multiplexed together onto a single waveguide such as an optical fibre. The carrier wavelengths are spaced apart by as little as 50 GHz in a spacing arrangement defined by an ITU (International Telecommunications Union) channel "grid". Each carrier wavelength may be modulated to provide a respective data transmission channel. By using many channels, the data rate of each channel can be kept down to a manageable level, so avoiding the need for expensive very high data rate optical transmitters, optical receivers and associated electronics.

It has been proposed that DWDM can make better use of the inherent bandwidth of an optical fibre link, including links which have already been installed. It also allows a link to be upgraded gradually, simply by adding new channels.

However, one particularly advantageous feature of DWDM is that it allows all-optical routing of telecommunications signals. To implement this aspect of DWDM technology, it is necessary to develop a new range of optical components such as switchers, cross-point networks, channel add-drop multiplexers, variable optical attenuators and so on. It has been proposed that so-called optical integrated circuits offer potential to meet these needs.

Various solutions have been proposed to provide a variable optical attenuation in all-fibre systems. A proposed product marketed by the Molecular OptoElectronics Corporation (MOEC) under the generic family name "Shadow" is an all-fibre attenuator where the degree of optical attenuation can be controlled by an electrical signal.

The "Shadow" device uses an optical fibre which is bent into an arc and then side-polished on the surface at the outer part of the arc. This side-polishing removes a portion of the fibre cladding which is then replaced by a proprietary thermo-optic material having an associated electrical heater. The thermo-optic material has the property that its refractive index varies markedly in response to temperature over an operating temperature range.

In order to obtain minimum attenuation with this arrangement, the temperature of the thermo-optic material is set so that the refractive index of the thermo-optic material is substantially matched to that of the fibre cladding. (Here it is noted that the refractive index of the core of an optical fibre is usually higher than that of the cladding, which is in turn higher than that of the surrounding air). In this operating condition, the thermo-optic material acts as a cladding to light propagating along the fibre, and so most or substantially all of the light propagates along the fibre as normal.

However, if the refractive index of the thermo-optic material is raised towards that of the core, then light starts to couple via evanescent coupling into the thermo-optic material. The light does not couple back into the fibre and so, as far as propagation along the fibre is concerned, a loss or attenuation has been suffered. The degree of attenuation depends on the refractive index difference between the cladding and the thermo-optic material, and so depends on the amount of heating provided—which in turn of course depends on the electrical heating current.

Various respective aspects of the invention are defined in the appended claims.

This invention also provides an optical device comprising:

a substrate having at least one light-guiding core and cladding material surrounding the core;

a cladding-modifying element disposed alongside at least in part, a portion of the light-guiding core, the cladding-modifying element being formed of a material different to the cladding material so that the refractive index difference between the material of the cladding-modifying element and the cladding material is dependent upon the temperature of the cladding-modifying element; and a heating and/or cooling arrangement for altering the temperature of the cladding-modifying element.

The invention builds on the general idea of the MOEC device described above, in the field of integrated optical components based on a substrate. The use of a substrate allows many advantageous features such as a locally narrowed core (see below) or the possible use of a plurality of devices on a single substrate.

Embodiments of the invention also recognise that in the context of a substrate, the light-guiding core can be narrowed without substantially affecting the physical robustness or the optical properties of the device. By this counterintuitive step of narrowing the core, the evanescent field of a transmitted optical signal, i.e. that part of the field existing outside of the core, is correspondingly increased. In operating conditions in which the cladding-modifying element has an appropriate refractive index that light is coupled out of the core by evanescent coupling, the increased evanescent field brought about by the reduced core size makes this evanescent coupling much more efficient. This in turn can give the attenuator a better, or more complete, extinction of the input optical signal.

The skilled man will appreciate that narrowing the core would be difficult or impossible to achieve in the MOEC device, because that device relies on precision side polishing of an optical fibre. If that optical fibre were already narrowed to reduce the core size, or "tapered" as the term is used in the art, it would be significantly weaker physically and also the overall diameter of the fibre would be so much smaller. Both of these would make the polishing process almost impossible.

Embodiments of the invention will now be described with reference to the accompanying drawings, throughout which like parts are referred to by like references, and in which.

Figure 5:
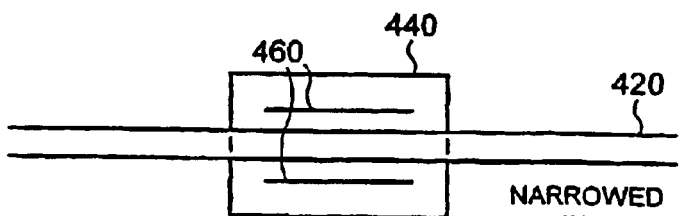
Figure 6:
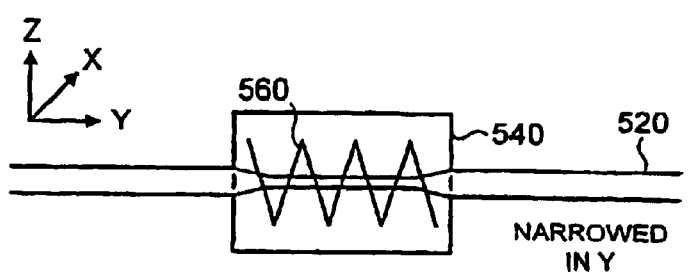
Figure 7:
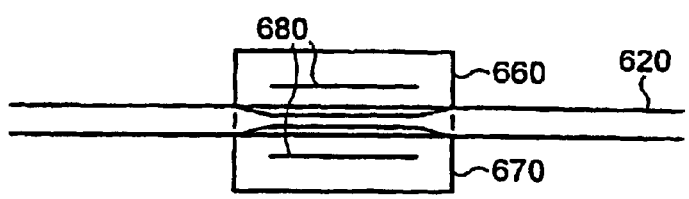
Figure 8:
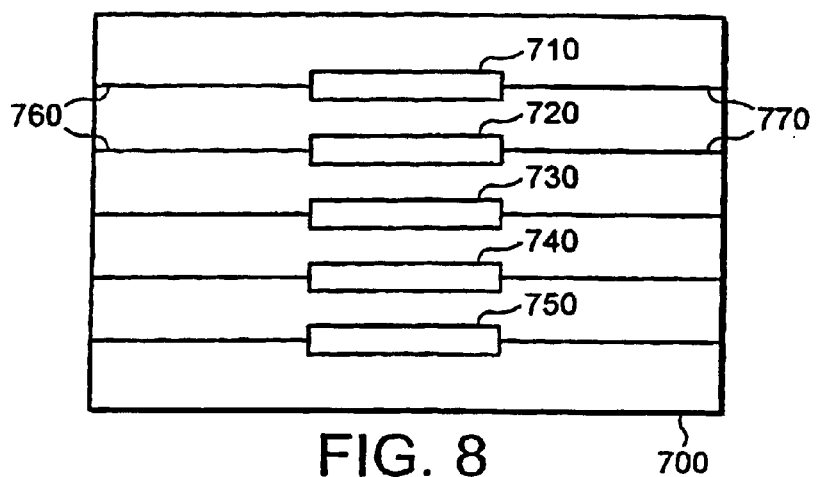

FIGS. 5 to 7 schematically illustrate plan views of further embodiments of optical attenuators; and FIG. 8 schematically illustrates a substrate carrying an array of attenuators.

Figure 1:
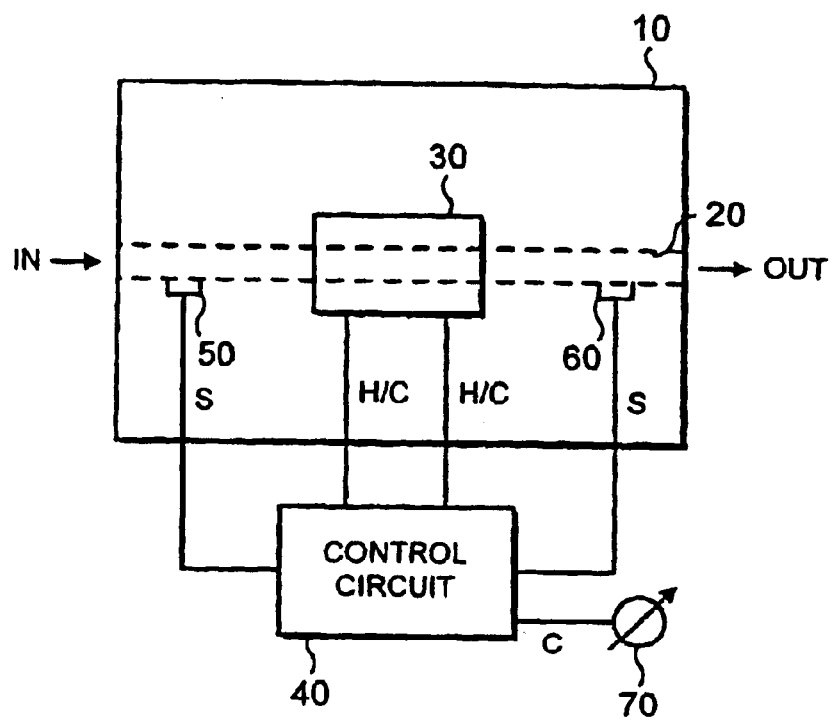
FIG. 1 is a schematic plan view of an optical attenuator.

FIG. 1 is a schematic plan view of an optical attenuator. The attenuator comprises a substrate 10 formed of, for example, a silica-on-silicon structure and having a waveguide core (of raised refractive index) 20 formed within it.

A part of the cladding layer covering the waveguide core 20 is modified by the inclusion or addition of a polymer region and an electrical heating and/or cooling element. For the purposes of FIG. 1, this modification is shown schematically as an area 30, but it will be described in much more detail below.

A control circuit 40 controls operation of the device. The control circuit supplies electrical signals (H/C) to the heating and/or cooling arrangement and receives electrical signals (S) from two optical sensors 50, 60 which detect the optical power passing along the waveguide before and after the region of modification 30. The control circuit also receives a control input signal C from a user-variable or automated attenuation adjuster 70. The way in which the control circuit 40 processes the input signals C and S to generate its output signals H/C will be described in detail before. In general, however, the device is arranged so that variation of the attenuation adjuster 70 causes a corresponding variation in the amount of attenuation introduced by the attenuator, that is to say, it changes the ratio between the optical output power and the optical input power for the device of FIG. 1.

Figure 2:
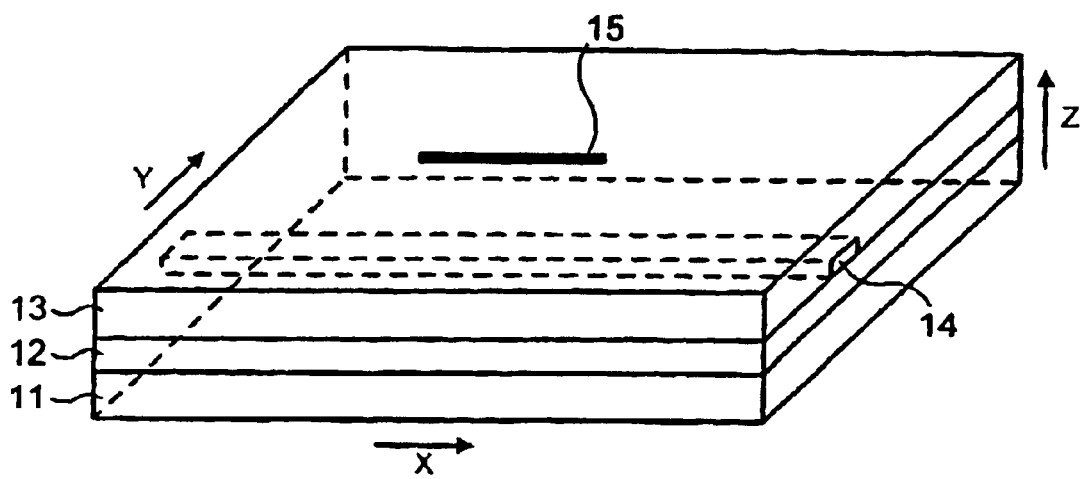
FIG. 2 is a schematic perspective view of an optical substrate.

FIG. 2 is a schematic perspective view of a planar optical substrate including a fabricated core region. FIG. 2 is included partly in order to define a set of axes for use in the following description. So, on FIG. 2, the axes (x, y, z) are defined with respect to the direction of propagation along the core.

FIG. 2 also illustrates schematically the way in which an optical waveguide is actually formed on a substrate in embodiments of the invention. In the fabrication process used to create the waveguide arrangement, a number of layers of material are deposited. So, a silica waveguide is defined to consist of the following regions:

- a substrate 11 of silicon, $SiO_2$ (silica) or the like
- a (possibly doped) silica buffer layer 12 deposited by thermal oxidation or by flame hydrolysis deposition, and of course not required on a silica substrate
- a (possibly doped) silica cladding layer 13 deposited by flame hydrolysis (FHD) or plasma enhanced chemical vapour deposition
- one or more (possibly doped) cores 14 surrounded by the cladding and buffer regions The cores may be formed by laying down a layer of core glass by FHD and a consolidation step, then photolithographically masking and etching to form the core paths. The cladding and any other subsequent layers can then be established by FHD.
- a thin film heater 15 of metal such as, for example, nichrome, chromium, nickel or tantalum nitride, deposited using standard metal deposition techniques.

For the purposes of characterising an optical waveguide, the following parameters are defined:

| | |
|---|---|
| $n_{substrate}$ | substrate 11 refractive index |
| $n_{buffer}$ | buffer 12 refractive index |
| $n_{clad}$ | cladding 13 refractive index |
| $n_{core}$ | core 14 refractive index |
| $t_{substrate}$ | substrate 11 thickness |
| $t_{buffer}$ | buffer 12 thickness |
| $t_{clad}$ | cladding 13 thickness |
| $t_{core}$ | core 14 thickness |
| $W_{core}$ | core 14 width |

Figure 3:
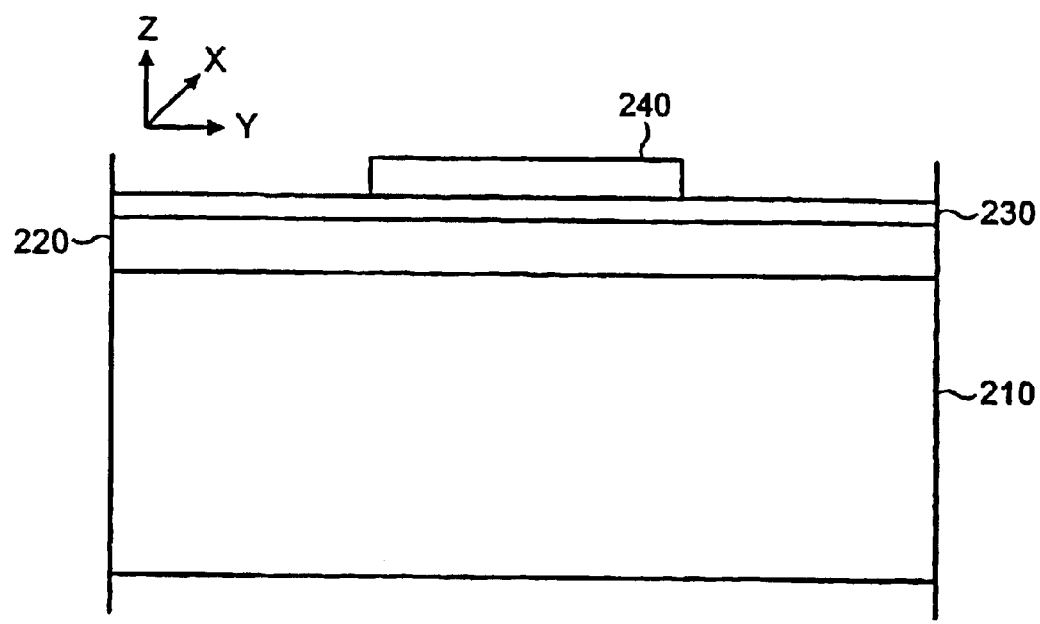
FIG. 3 is a schematic side elevation of the device of FIG. 1.
Figure 4:
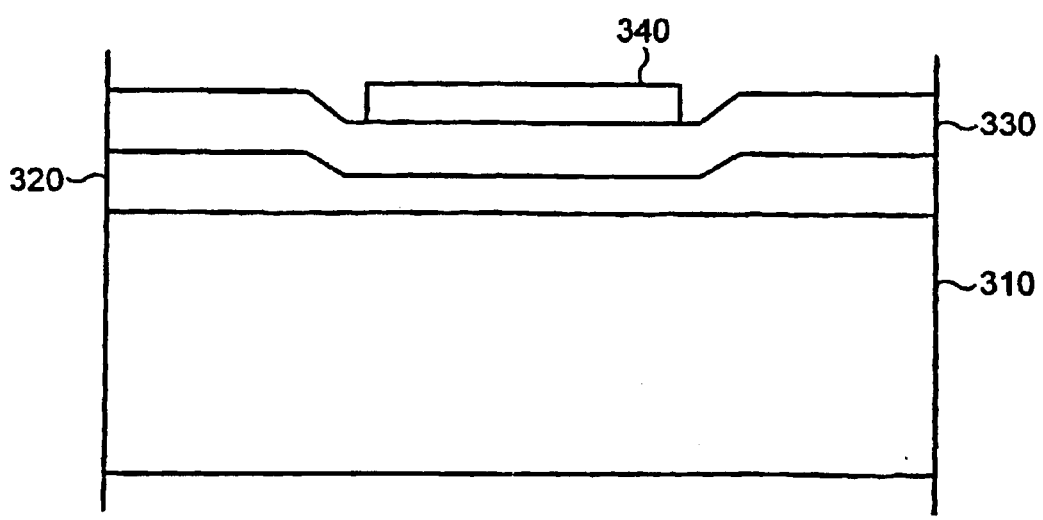
FIG. 4 is a schematic side elevation of a second embodiment of an optical attenuator.

A waveguide fabricated according to embodiments of the invention is defined to possess the following characteristics:
Refractive Index (RI)
$n_{core} > n_{clad}, n_{buffer}$
$n_{substrate} \gg n_{buffer}, n_{clad}, n_{core}$ (for Si substrate)
$n_{substrate} \leq n_{buffer}, n_{clad}, n_{core}$ (for $SiO_2$ substrate)
Dimensions
$t_{substrate} \gg t_{clad} + t_{buffer}$
$t_{clad}, t_{buffer} > t_{core}$ FIGS. 3 to 7 schematically illustrate various embodiments of the present invention. In particular, FIGS. 3 and 4 are schematic side elevations and FIGS. 5 to 7 are schematic plan views. Basically, an embodiment of the invention is described by one of the side elevations in conjunction with one of the plan views, so defining the cross-sectional shape of the core and cladding etc. in two-orthogonal dimensions.

Referring to FIG. 3, an arrangement is shown in which a silicon substrate 210 has formed on it a core 220 and a cladding layer 230 over the core 220. It is noted that in FIG. 3, the core is not narrowed in the z direction.

Onto the cladding a polymer layer or block 240 is deposited as a cladding-modifying element. Heating and/or cooling means (not shown) such as a micro-heater or a Peltier cooling element are arranged so as to vary the temperature of the polymer block 240. The polymer has a property that its refractive index varies with temperature—preferably, though not exclusively, at a greater rate of change than that of the substrate, core or cladding materials and again preferably, though not exclusively, in the opposite sense to those materials.

Attenuation of the device is at a minimum when the temperature is set so that the refractive index of the polymer block 240 is set to match that of the cladding layer 230. In this mode of operation the polymer block simply acts as an extension of the cladding 230 and makes little difference to light propagating along the core 220.

However, if the temperature is altered so that the refractive index of the polymer block 240 is raised towards that of the core 220 or (in other embodiments) reduced below that of the cladding, then light starts to couple via evanescent coupling into the polymer block. This light does not couple back into the core and so, as far as propagation along the core 220 is concerned, a loss or attenuation has been suffered.

The degree of attenuation of the device, in other words the ratio of input power to output power, thus depends on the refractive index of the polymer block 240 with respect to that of the cladding 230 and the core 220, and so in turn depends on the temperature of the polymer block 240.

A feedback control arrangement can be employed in the control circuit 40. When a desired degree of attenuation is selected by the automated attenuation adjuster 70, the control circuit monitors the optical powers detected by the detectors 50 and 60 and controls the electrical signals sent to the heating and/or cooling arrangement in order to obtain the desired degree of attenuation. This is a standard negative feedback control arrangement which, of itself, can be implemented using entirely routine techniques by the man skilled in the art.

Suitable materials for the cladding modifying element include silicone resin, polysilioxane, halogenated silicone resin, halogenated polysilioxane, polyamides, polycarbonates or the like. The rate of change of refractive index for these materials with respect to temperature (dn/dT) is of the order of $-1 \times 10^{-4}$ to $-5 \times 10^{-5}$ per degree Celsius. This compares with a much smaller and positive dn/dT for typical glass materials of the order of $+1 \times 10^{-5}$. The much larger magnitude and opposite sense dn/dT for the polymer material means that the heating of the cladding modifying element does not have to be completely localised to that element—in fact, depending on whether other polymer features requiring independent responses are formed on the same device, the entire device could even be heated or cooled to effect a temperature change of the cladding modifying element and so vary its response.

FIG. 4 illustrates a further arrangement of a substrate 310 on which a core 320, a cladding layer 330 and a polymer block 340 are disposed. The core 320 is narrowed in the z direction.

By narrowing the core, the evanescent field of an optical signal transmitted via the core 320 is increased so that it extends farther into the polymer block 340. So, in operating conditions in which the polymer lock 340 has an appropriate refractive index so that light is coupled out of the core by evanescent coupling, the increased evanescent field bought about by the reduced core size makes this evanescent coupling much more efficient. This in turn can give the attenuator a better, or more complete, extinction of the input optical signal.

FIGS. 5 to 7 schematically illustrate plan views of optical attenuators according to the present invention. In describing FIGS. 5 to 7, in order to avoid confusion between the drawings different reference numerals will be used to those employed in FIGS. 3 and 4, although it will be appreciated that an embodiment of the invention may be fully described by a side elevation in conjunction with a plan view.

FIG. 5 schematically illustrates a core 420 over which a polymer block 440 is formed. The core is not tapered in the y direction so accordingly this plan view forms an embodiment of the invention in conjunction with the narrowing in the z direction shown in FIG. 4.

Heating and/or cooling elements 460 are disposed on the polymer block. In this preferred embodiment they are disposed symmetrically about the axis of the core 420 so as to give a more uniform heating effect.

FIG. 6 schematically illustrates an arrangement in which the core 520 is narrowed in the y direction. A polymer block 540 extends across the entire core in the y direction and is heated by a zigzag heating wire arrangement 560.

FIG. 7 schematically illustrates a further arrangement in which a core 620 is narrowed in the y direction and two discrete polymer blocks 660, 670 are disposed over the cladding layer (not shown). Each of the two polymer blocks 660, 670 is heated by a respective micro-heater 680.

In terms of the fabrication process, a narrowing of the core can be achieved in the x-y direction by simply varying the mask width at that region. So, this is a very straightforward design step for the skilled man. A narrowing in the z direction can be achieved by various means. In the preferred arrangement in which FHD, consolidation and post-etching is used to form the cores, a second masking and (wet or dry) etching step can be undertaken to thin down the core locally, masking off all other parts of the core. Of course, these techniques for narrowing can both be applied to the same portion of the core, to give a narrowing in two orthogonal directions, which could be applied to any of the "narrowed" embodiments described above.

When the cladding is applied in an FHD arrangement, it tends to follow the profile of the underlying features. So, if the core is thinned, the cladding can follow the thinned profile at that region. Depending on the cladding thickness and the consolidation parameters a flat-topped cladding could be obtained instead.

The polymer may be applied as a locally introduced drop of molten polymer which then solidifies to form the desired feature.

The polymer region (or at least the far end of the polymer region, in the direction of travel of light through the waveguide) may be tapered in thickness, so as to become narrower at the edge, so as to merge smoothly into the outer profile of the waveguide. Light which is coupled into the polymer by evanescent coupling out of the waveguide core is dissipated at the edge of the polymer region.

FIG. 8 schematically illustrates a substrate 700 carrying an array of attenuators 710 ... 750, each having a respective input waveguide 760 and output waveguide 770. Each attenuator is similar to the device shown in FIG. 1. The attenuators may be driven by a common heating/cooling arrangement or (more flexibly) by respective heating/cooling arrangements. Other optical components (not shown) may also be formed on the substrate.

What is claimed is:

1. An optical device comprising:
    a substrate having at least one light-guiding core and cladding material surrounding the core;
    a cladding-modifying element disposed alongside, at least in part, a portion of the light-guiding core, the cladding-modifying element being formed of a material different to the cladding material so that the refractive index difference between the material of the cladding-modifying element and the cladding material is dependent upon the temperature of the cladding-modifying element, and the cladding-modifying element being disposed with respect to the core so that in operating conditions in which the refractive index of the cladding-modifying element is different to the refractive index of the cladding, light passing along the core is coupled by evanescent coupling out of the core and into the cladding-modifying element; and
    a heating and/or cooling arrangement for altering the temperature of the cladding-modifying element; and wherein
    the portion of the core is narrowed.

2. A device according to claim 1, in which the portion of the core is narrowed in one direction perpendicular to the length of the core.

3. A device according to claim 1, in which the portion of the core is narrowed in two orthogonal directions perpendicular to the length of the core.

4. A device according to claim 1, in which the rate of change of refractive index with temperature for the material of the cladding-modifying element has a greater magnitude than the rate of change of refractive index with temperature of the cladding and/or core material.

5. A device according to claim 1, in which the rate of change of refractive index with temperature for the material of the cladding-modifying element has the opposite sense to the rate of change of refractive index with temperature of the cladding and/or core material.

6. A device according to claim 1, in which the heating and/or cooling arrangement is arranged so as to alter the temperature of the cladding-modifying element with respect to the temperature of the light-guiding core.

7. A device according to claim 1, in which the heating and/or cooling arrangement comprises one or more electrical heating elements disposed on, over or alongside the cladding-modifying element.

8. A device according to claim 1, in which the heating and/or cooling arrangement comprises one or more electrical cooling elements disposed on or over the cladding-modifying element.

9. A device according to claim 1, in which the cladding-modifying element is formed of a polymer material.

10. A device according to claim 1, in which the heating and/or cooling arrangement is operable to set the temperature of the cladding-modifying element to a first operating condition in which the refractive index of the cladding-modifying element is substantially identical to the refractive index of the cladding, and to a second operating condition in which the refractive index of the cladding-modifying element is greater than the refractive index of the cladding.

11. A device according to claim 1, in which the heating and/or cooling arrangement is operable to set the temperature of the cladding-modifying element to a first operating condition in which the refractive index of the cladding-modifying element is substantially identical to the refractive index of the cladding, and to a second operating condition in which the refractive index of the cladding modifying element is less than the refractive index of the cladding.

12. An optical substrate on which are formed a plurality of devices according to claim 1.

* * * * *